United States Patent
Blanchflower et al.

(10) Patent No.: US 10,262,458 B2
(45) Date of Patent: Apr. 16, 2019

(54) THREE-DIMENSIONAL OBJECT MODELING

(71) Applicant: LONGSAND LIMITED, Cambridge (GB)

(72) Inventors: Sean Blanchflower, Cambridge (GB); George Saklatvala, Cambridge (GB)

(73) Assignee: LONGSAND LIMITED, Cambridge, Cambridgeshire (GB)

( * ) Notice: Subject to any disclaimer, the term of this patent is extended or adjusted under 35 U.S.C. 154(b) by 213 days.

(21) Appl. No.: 14/890,769

(22) PCT Filed: May 31, 2013

(86) PCT No.: PCT/EP2013/061324
§ 371 (c)(1),
(2) Date: Nov. 12, 2015

(87) PCT Pub. No.: WO2014/191055
PCT Pub. Date: Dec. 4, 2014

(65) Prior Publication Data
US 2016/0163098 A1 Jun. 9, 2016

(51) Int. Cl.
*G06T 17/10* (2006.01)
*G06T 15/50* (2011.01)
(Continued)

(52) U.S. Cl.
CPC ............... *G06T 17/10* (2013.01); *G06T 7/55* (2017.01); *G06T 7/97* (2017.01); *G06T 15/50* (2013.01);
(Continued)

(58) Field of Classification Search
USPC ....................................................... 345/419
See application file for complete search history.

(56) References Cited

U.S. PATENT DOCUMENTS 9,053,555 B1 * 6/2015 Ogale ................... G06T 7/0075
2004/0189686 A1 9/2004 Tanguay
(Continued)

FOREIGN PATENT DOCUMENTS

| CN | 101281656 | 10/2008 |
|----|-----------|---------|
| CN | 101430798 | 5/2009 |

OTHER PUBLICATIONS

European Patent Office, International Search Report and Written Opinion for PCT/EP2013/061324 dated Feb. 17, 2014 (13 pages).
(Continued)

*Primary Examiner* — Kimbinh T Nguyen (57) ABSTRACT

Techniques associated with three-dimensional object modeling are described in various implementations. In one example implementation, a method may include receiving a plurality of two-dimensional images depicting views of an object to be modeled in three dimensions. The method may also include, processing the plurality of two-dimensional images to generate a three-dimensional representation of the object, and analyzing the three-dimensional representation of the object to determine whether sufficient visual information exists in the plurality of two-dimensional images to generate a three-dimensional model of the object. The method may also include, in response to determining that sufficient visual information does not exist for a portion of the object, identifying the portion of the object to a user.

20 Claims, 4 Drawing Sheets

(51) Int. Cl.
*G06T 19/20* (2011.01)
*G06T 7/00* (2017.01)
*G06T 7/55* (2017.01)

(52) U.S. Cl.
CPC .......... *G06T 19/20* (2013.01); *G06T 2200/04* (2013.01); *G06T 2200/08* (2013.01); *G06T 2200/21* (2013.01); *G06T 2200/24* (2013.01); *G06T 2207/10004* (2013.01); *G06T 2207/10028* (2013.01); *G06T 2207/20092* (2013.01); *G06T 2207/20221* (2013.01); *G06T 2215/16* (2013.01)

(56) References Cited

U.S. PATENT DOCUMENTS

| | | |
|---|---|---|
| 2005/0053275 A1 | 3/2005 | Stokes |
| 2011/0187716 A1 | 8/2011 | Chen |
| 2012/0299918 A1 | 11/2012 | Abeloe |
| 2013/0033581 A1 | 2/2013 | Woo et al. |
| 2013/0136341 A1 | 5/2013 | Yamamoto |
| 2014/0028799 A1* | 1/2014 | Kuffner ............ G01B 11/24 348/46 |
| 2015/0154795 A1* | 6/2015 | Ogale ............ G06T 7/0075 345/420 |

OTHER PUBLICATIONS

McCue, TJ, Forbes, Turn Your Photos Into 3D Models With Autodesk 123D Catch for Apple iPad dated on or before Jan. 9, 2013 (4 pages).

McEnaney, M., How to Print Your 3D Images, Jan. 31, 2011 (2 pages).

Wendel et al., Dense Reconstruction on-the-fly, Computer Vision and Pattern Recognition (CVPR), Jun. 16, 2012 (8 pages).

* cited by examiner

THREE-DIMENSIONAL OBJECT MODELING

BACKGROUND

Three-dimensional printing, which may also be referred to as additive manufacturing, is a technology that allows for a three-dimensional object to be "printed" based on a three-dimensional model of the desired object. For example, three-dimensional printers may accept three-dimensional computer-aided design (CAD) drawings or other appropriate three-dimensional models as inputs, and may produce a three-dimensional "print out" of the object described by the model.

To print a desired object, a three-dimensional printer may "slice" the three-dimensional model of the object into digital cross-sections or layers of varying shapes, and may print or construct the desired object layer-by-layer according to the cross-sections. Depending on the configuration of the three-dimensional printer, the printed objects may be constructed using a variety of different materials, such as plastics, ceramics, metals, papers, or other appropriate materials.

DETAILED DESCRIPTION

Three-dimensional models, such as those that may be used as inputs to three-dimensional printers, are often created by designers or draftsmen using complex modeling software. Modeling a three-dimensional object in such a manner may require a significant amount of skill, effort, and/or time, and may also be a relatively expensive process.

Described herein are techniques for modeling three-dimensional objects that may be performed by skilled or unskilled users alike, and that may be implemented using commercially-available computing devices, such as smartphones, tablets, laptop computers, and other appropriate computing devices. In accordance with the techniques, a user may capture images of an object that the user wishes to model using a camera, such as a camera that is integrated into a smartphone or other appropriate mobile device. The user may capture multiple images (e.g., in the form of still images or video capture) corresponding to multiple views of the object, and the multiple images may be used to generate an accurate three-dimensional model of the object, which in some cases may be used as an input to a three-dimensional printer. As described herein, the techniques may include a user interface provided by the computing device (e.g., a display of a smartphone) that guides the user to capture additional or alternative views of specific areas of the object by identifying areas of the object that have not been adequately captured. For example, the user may be shown one or more areas of the object that lack sufficient information to generate an accurate three-dimensional model, and the user may then focus the camera on those areas, or otherwise capture additional images or views associated with those areas, such that additional visual information may be obtained for use in modeling the object.

In one example implementation, a method of modeling a three-dimensional object may include receiving a plurality of two-dimensional images depicting views of an object to be modeled in three dimensions. The method may also include processing the plurality of two-dimensional images to generate a three-dimensional representation of the object, and analyzing the three-dimensional representation of the object to determine whether sufficient visual information exists in the plurality of two-dimensional images to generate a three-dimensional model of the object. The method may also include, in response to determining that sufficient visual information does not exist for a portion of the object, identifying the portion of the object to a user, e.g., such that additional views of the portion of the object may be captured.

In another example implementation, a mobile computing system may include an image capture device to capture two-dimensional images depicting views of an object to be modeled in three dimensions. The mobile computing system may also include one or more processors to process images as they are captured by the image capture device to generate a three-dimensional map of an object depicted in the images; to analyze the three-dimensional map of the object to determine whether sufficient visual detail exists in the images to generate a three-dimensional model of the object; and to identify a portion of the object that lacks sufficient visual detail in response to determining that sufficient visual detail does not exist.

In another example implementation, a non-transitory computer-readable storage medium may store instructions that, when executed by one or more processors, cause the one or more processors to receive a plurality of images captured by an image capture device, the plurality of images depicting views of an object to be modeled in three dimensions. The instructions may also cause the processors to process the plurality of images to generate visual information associated with the object, and to determine whether the visual information is sufficient to reconstruct a well-defined three-dimensional model of the object. The instructions may also cause the processors to, in response to determining that the visual information associated with a portion of the object is insufficient to reconstruct a well-defined three-dimensional model of the portion of the object, guide a user to capture additional views of the portion of the object.

Figure 1:
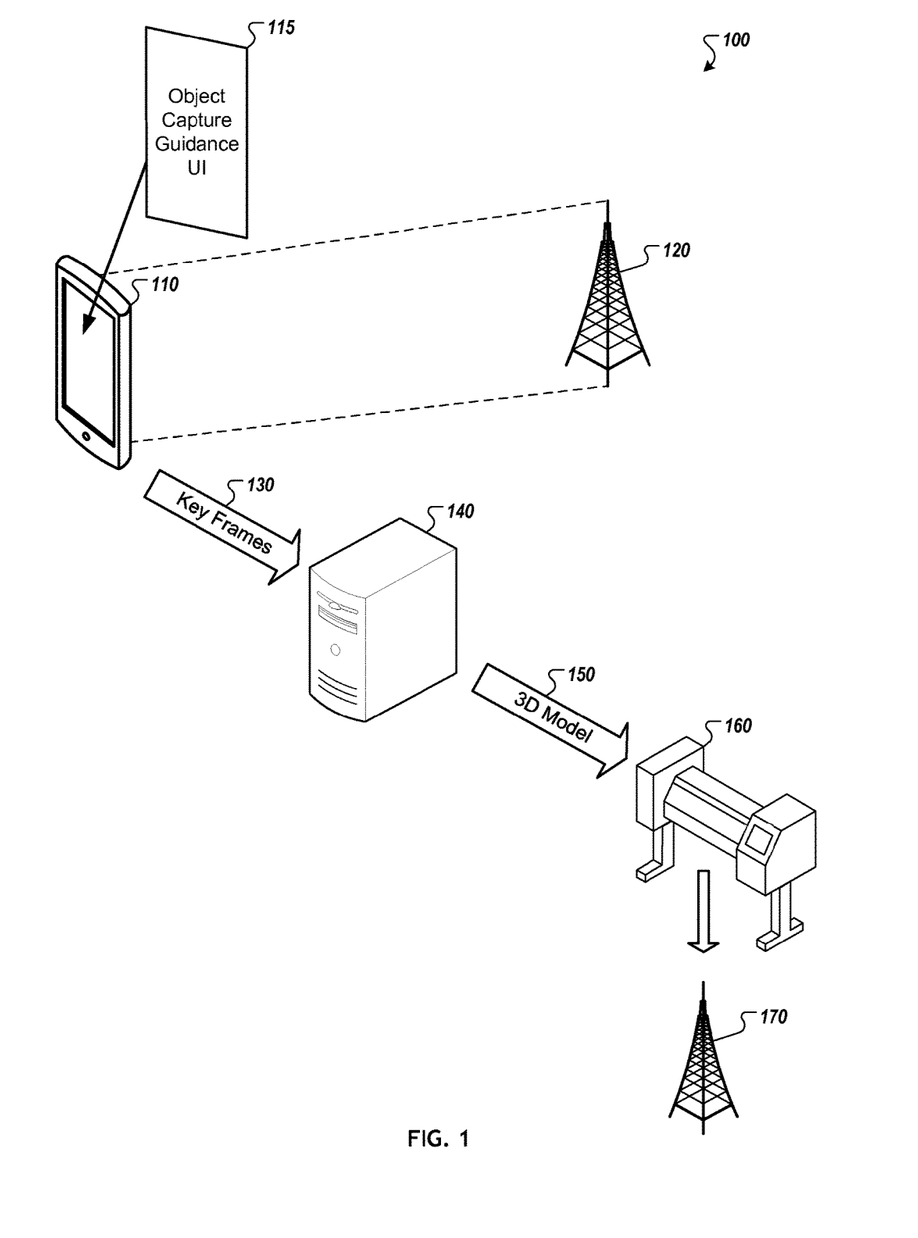
FIG. 1 is a conceptual diagram of an example three-dimensional object modeling environment in accordance with implementations described herein.

FIG. 1 is a conceptual diagram of an example three-dimensional object modeling environment 100 in accordance with implementations described herein. As shown, environment 100 includes a mobile computing device 110 and a target object 120. The mobile computing device 110 includes an object capture guidance user interface 115 that helps to guide the user in capturing sufficient views of the target object 120 such that an accurate, well-defined three-dimensional model of the object may be created. Environment 100 may also include an object modeling server 140 and a three-dimensional printer 160, which may be used to "print out" a replica 170 of the target object 120 following appropriate capture and modeling of the target object 120 as described below.

The example topology of environment 100 may be representative of various three-dimensional object modeling environments. However, it should be understood that the example topology of environment 100 is shown for illustrative purposes only, and that various modifications may be made to the configuration. For example, environment 100 may include different or additional devices, or the devices may be implemented in a different manner than is shown. Also, while mobile computing device 110 and object modeling server 140 are generally illustrated as a smartphone and a standalone server, respectively, it should be understood that other appropriate computing devices (e.g., tablets, servers, laptops, desktops, workstations, and the like) or groups of computing devices (e.g., clusters of servers or the like) operating individually or together may also or alternatively be used to perform all or portions of the functionality described herein. In addition, although not depicted in FIG. 1, the various devices may be communicatively coupled to one another via one or multiple networks, such as a local area network (LAN) or a wide area network (WAN), or over combinations of appropriate networks.

In operation, mobile computing device 110 may be operated by a user to capture a number of two-dimensional images of target object 120, each of the images corresponding to a particular view of the object. While the following discussion assumes a camera integrated with mobile computing device 110, it should be understood that a separate standalone camera (not shown), or multiple cameras, may be used to capture images of target object 120, and such captured images may then be provided from the separate standalone camera to the mobile computing device 110 to be processed in the manner discussed below.

The images may be captured and/or provided in any appropriate format, such as in frames of a video feed or in a series of photographic still images of the target object 120. For example, in some cases, a camera integrated into the mobile computing device 110 may be placed into a video capture mode, and the user may move the camera with respect to the target object in an effort to adequately capture the various sides, surfaces, and other visual details that define the overall structure of the target object 120. In another example, the user may take still photographs of various views of the object, e.g., from different angles, distances, zoom levels, or the like.

Based on the captured images, the object capture guidance user interface 115 may indicate to the user whether sufficient visual information exists in the captured images to generate a well-defined, accurate three-dimensional model of the object, e.g., for purposes of creating a replica 170 of the object using a three-dimensional printer 160. If not, then the object capture guidance user interface 115 may guide the user through an iterative process of capturing additional views of the object until enough visual information exists to generate the three-dimensional model. Once sufficient visual information exists to generate the well-defined, accurate three-dimensional model of the target object, the user may be prompted to provide at least a portion of the visual information (e.g., key frames 130) to the object modeling server 140, which in turn may generate a three-dimensional model 150 of the target object based on the visual information. The three-dimensional model 150 may then be provided to the three-dimensional printer 160 for printing.

To determine whether sufficient visual information exists in the captured images to generate a well-defined, accurate three-dimensional model of the target object 120, the object capture guidance user interface 115 may process any captured images of the target object to build a sparse map of the target object on the device 110. The sparse map may include a number of various feature points associated with visually interesting features of the target object (e.g., corners, edges, inflection points, and/or other points of interest). In some implementations, the sparse map of the target object may be generated using simultaneous localization and mapping (SLAM) processing. SLAM processing may be used to build up a map of a completely unknown target object 120, or to update a previous map of a partially-known target object 120. The object capture guidance user interface 115 may also attempt to fit a mesh to the sparse map, e.g., by connecting appropriate feature points using an appropriate meshing technique.

The sparse map and/or the mesh may then be used to guide the user by indicating to the user what visual information is lacking from the captured images, e.g., any additional views of a particular region of the target object that are needed to "fill in" the details for building the three-dimensional model. For example, in some implementations, the sparse map and/or the mesh may be displayed to a user, e.g., via the object capture guidance user interface 115 of the mobile computing device 110, so that the user can visually inspect whether the target object is being represented as expected, or whether certain portions of the three-dimensional representation appear to be under-represented by feature points or otherwise lacking in detail.

The object capture guidance user interface 115 may also analyze the sparse map to determine whether sufficient visual information exists in the captured images. For example, user interface 115 may identify whether any portions of the sparse map are under-represented by feature points, e.g., by comparing the number of feature points in a particular region to a threshold value and determining that the region lacks sufficient information when the number of feature points is less than the threshold value. The threshold value may be configurable and/or may be dependent on a number of factors, such as the absolute or relative size, complexity, or other features of the target object or of the particular region. The threshold value may also be dependent on the quality and/or resolution of the images. As another example, user interface 115 may identify a region of the target object as being under-represented by feature points when a mesh cannot be fitted to the feature points in the region.

In the case that the object capture guidance user interface 115 determines that sufficient visual information is lacking for a particular portion of the target object, the portion that is lacking sufficient detail may be identified to a user, such that the user can capture additional views of that particular portion of the target object. For example, the object capture guidance user interface 115 may highlight the portion of the object on the display of the mobile computing device 110 or may otherwise indicate that a particular region would benefit from additional captured views of the region.

As a result of such an indication, the user may be prompted to capture additional images depicting views of the particular portion of the target object that is lacking sufficient visual information, and the additional images may be fed back and processed in conjunction with the previously captured images in an iterative manner. For example, the target computing device 110 may be used to capture additional images depicting views of the particular portion of the object that lacks sufficient visual information, and the additional images may be processed to update the feature points included in the sparse map. These steps may be repeated until sufficient visual information exists to adequately model the target object.

After it is determined that sufficient visual detail exists in the captured images to generate a well-defined, accurate three-dimensional model of the target object, then the mobile computing device 110 may communicate key frames 130, selected from among the set of captured images, to object modeling server 140 for modeling the target object. The key frames may be selected such that the key frames alone (e.g., separate from all of the other images) provide sufficient visual detail to generate a three-dimensional model of the object. In some cases, the mobile computing device 110 may also communicate camera pose information associated with each of the key frames 130 to the server.

Upon receiving the key frames 130, the server may process the key frames 130, and in some cases the associated camera pose information, to generate a three-dimensional model that is compatible with a three-dimensional printer.

Figure 2A:
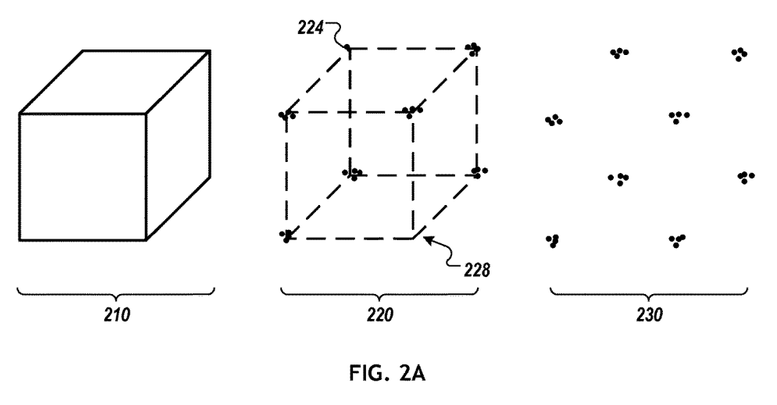
FIGS. 2A and 2B are conceptual diagrams of example object mappings in accordance with implementations described herein.
Figure 2B:
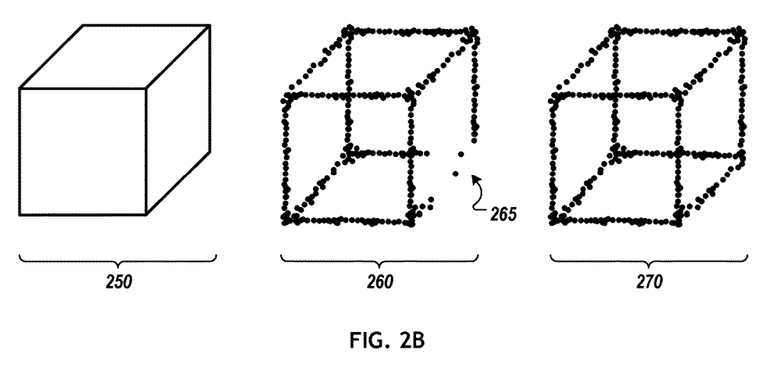

FIGS. 2A and 2B are conceptual diagrams of example object mappings in accordance with implementations described herein. In both of the figures, the target object is a relatively simple cube-shaped object, and the mappings are intended to show two possible mapping implementations. Of course, the example mappings are shown for illustrative purposes only, and it should be understood that other mappings may also be generated, even for a relatively simple object as is shown here.

In the example of FIG. 2A, the original three-dimensional mapping of the target object 210 is shown by the point cloud representation 220 where various feature points are clustered on and around the various corners of the cube. The dotted lines are shown to provide reference points associated with the edges and corners of the cube, but are shown for illustration purposes only. While many of the corners of the cube have been represented by clusters of multiple feature points, the back-upper-left corner only includes a single feature point 224, and the front-lower-right corner region 228 is completely lacking in feature points.

Given this point cloud representation 220, it is relatively unlikely that an accurate three-dimensional model could be reconstructed based on the originally captured images. As such, depending on the implementation, and in particular, whether feature point 224 is considered as conveying sufficient visual information to define that particular region of the cube, the object capture guidance user interface 115 of FIG. 1 may guide the user to capture additional views of the portions of target object 210 that are associated with just region 228, or of both region 228 and the region associated with feature point 224.

In this particular example, additional views were captured for both regions, resulting in a more well-defined point cloud representation 230 of the target object.

In the example of FIG. 2B, the original three-dimensional mapping of target object 250 is shown by the point cloud representation 260 where various feature points are clustered on and around the various edges of the cube (rather than just the corners). While most of the target object's edges appear to be well-defined with multiple feature points, the region 265 is lacking in visual information.

To ensure that the target object 250 may be adequately reconstructed in a three-dimensional model, the object capture guidance user interface 115 of FIG. 1 may guide the user to capture additional visual information associated with region 265, e.g., by capturing additional views of the back-bottom-right corner region of target object 250. After the user has captured the additional views, the well-represented point cloud representation 270 may be generated.

Figure 3:
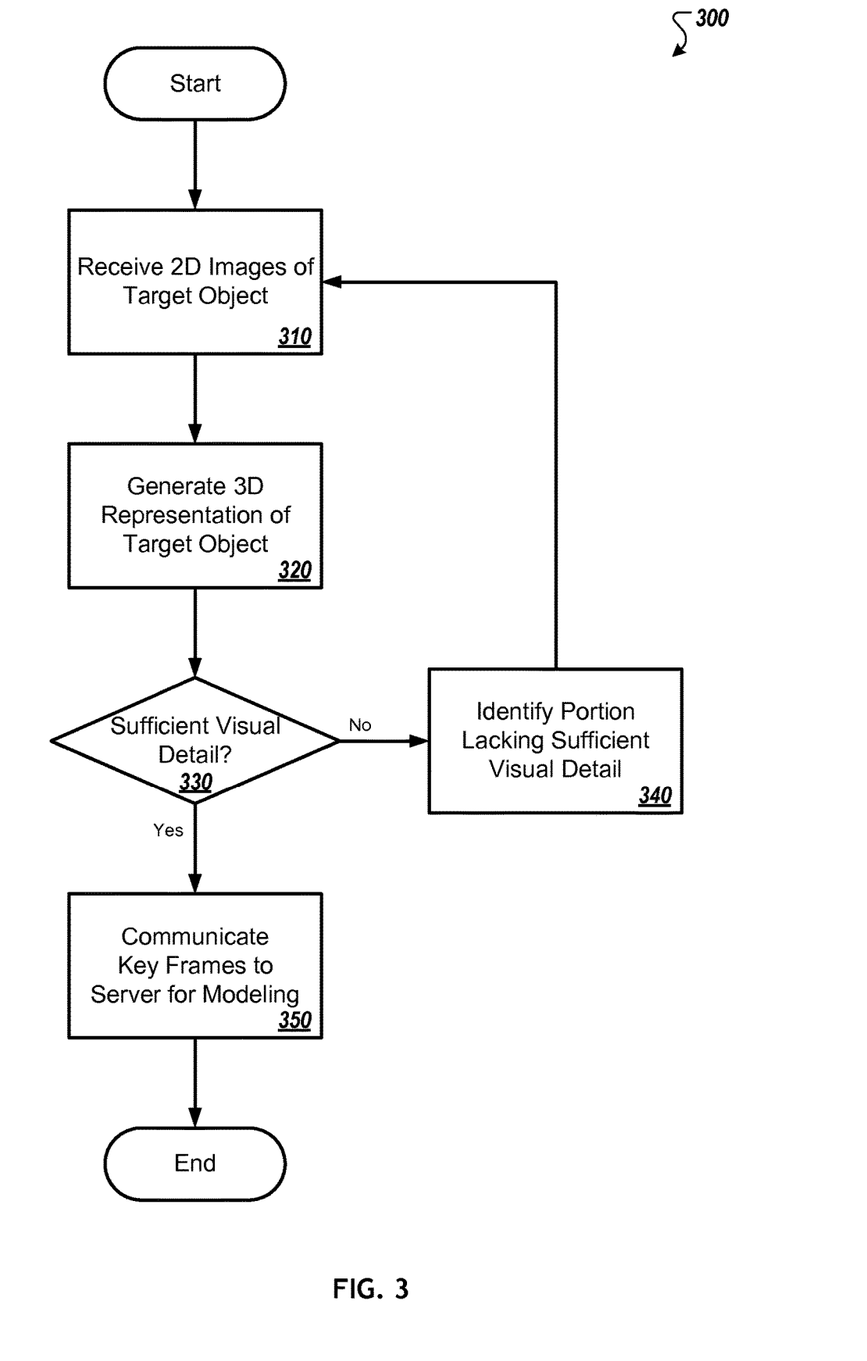
FIG. 3 is a flow diagram of an example process for modeling an object in three dimensions in accordance with implementations described herein.

FIG. 3 is a flow diagram of an example process 300 for modeling an object in three dimensions in accordance with implementations described herein. The process 300 may be performed, for example, by a computing device such as the mobile computing device 110 illustrated in FIG. 1. For clarity of presentation, the description that follows uses the mobile computing device 110 and object capture guidance user interface 115 illustrated in FIG. 1 as the basis of an example for describing the process. However, it should be understood that another system, or combination of systems, may be used to perform the process or various portions of the process.

Process 300 begins at block 310, in which two-dimensional images of a target object are received. For example, mobile computing device 110 may receive a number of images depicting different views of the target object, e.g., as captured by a camera integrated into the device itself, or as captured by a separate camera (or group of cameras) and then communicated to the mobile computing device 110. The images may be captured and/or provided in any appropriate format, such as in frames of a video feed or in a series of photographic still images of the target object. For example, in some cases, a camera integrated into the mobile computing device 110 may be placed into a video capture mode, and the user may move the camera with respect to the target object in an effort to adequately capture the various sides, surfaces, and other visual details that define the overall structure of the target object.

At block 320, a three-dimensional representation of the target object is generated based on the various images depicting the target object. For example, mobile computing device 110 may generate a point cloud representation of the target object, where various feature points (e.g., corners, edges, inflection points, and/or other points of interest) are mapped in a three-dimensional space. In some cases, simultaneous localization and mapping (SLAM) processing may be used, e.g., as the two-dimensional images are received, to generate a three-dimensional sparse map that represents the target object. In addition, mobile computing device 110 may attempt to fit a mesh to the feature points to simulate the surfaces of the three-dimensional representation.

In some implementations, the point cloud and/or the mesh may be displayed to a user, e.g., via the object capture guidance user interface 115 of the mobile computing device 110, so that the user can visually inspect whether the target object is being represented as expected, or whether certain portions of the three-dimensional representation appear to be under-represented by feature points or otherwise lacking in detail.

At block 330, it is determined whether sufficient visual detail exists in the plurality of two-dimensional images to generate a three-dimensional model of the target object. For example, the mobile computing device 110 may identify whether any portions of the point cloud representation are under-represented by feature points, e.g., by comparing the number of feature points in a particular region to a threshold value and determining that the region lacks sufficient information when the number of feature points is less than the threshold value. The threshold value may be configurable and/or may be dependent on a number of factors, such as the absolute or relative size, complexity, or other features of the target object or of the particular region. The threshold value may also be dependent on the quality and/or resolution of the images. As another example, the mobile computing device 110 may identify a region of the target object as being under-represented by feature points when a mesh cannot be fitted to the feature points in the region.

If it is determined that sufficient visual detail does not exist for a particular portion of the target object, then the portion that is lacking sufficient detail may be identified to a user at block 340, such that the user can capture additional views of that particular portion of the target object. For example, the portion of the target object may be identified to a user of the mobile computing device 110 via the object capture guidance user interface 115, e.g., by highlighting the portion on the display of the mobile computing device 110 or by otherwise indicating that a particular region would benefit from additional captured views of the region.

As a result of such an indication, the user may be prompted to capture additional images depicting views of the particular portion of the target object that is lacking in sufficient visual detail, and the additional images may be fed back and processed in conjunction with the previously captured images via blocks 310, 320, and 330. For example, in a subsequent iteration of block 310, the target computing device 110 may receive additional images depicting views of the particular portion of the object. At a subsequent iteration of block 320, the additional images may be processed to generate an updated three-dimensional representation of the target object. And at a subsequent iteration of block 330, it may be determined whether sufficient visual detail exists in the original set of two-dimensional images and in the additional captured images to generate a three-dimensional model of the target object. This iterative cycle may continue until the target object is well-defined by the captured images.

After it is determined that sufficient visual detail exists in the captured images to generate a three-dimensional model of the target object, then the mobile computing device 110 may communicate key frames, selected from among the set of captured images, to a server for modeling the target object at block 350. The key frames may be selected such that the key frames alone (e.g., separate from all of the other images) provide sufficient visual detail to generate a three-dimensional model of the object. In some implementations, the key frames may be communicated to a server that is separate from the mobile computing device 110, and which typically may provide more processing power than is available on the mobile computing device 110. In some cases, the mobile computing device 110 may also communicate camera pose information associated with each of the key frames to the server.

Then, the server may process the key frames, and in some cases the associated camera pose information, to generate a three-dimensional model that is compatible with a three-dimensional printer.

Figure 4:
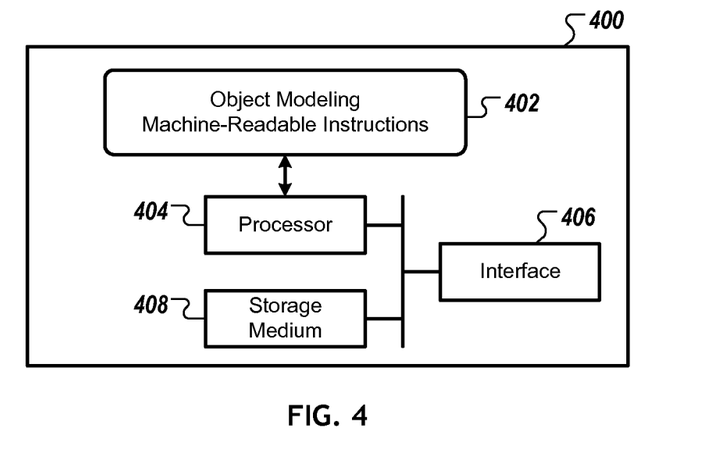
FIG. 4 is a block diagram of an example object modeling system in accordance with implementations described herein.

FIG. 4 is a block diagram of an example object modeling system 400 in accordance with implementations described herein. The system 400 includes object modeling machine-readable instructions 402, which may include certain of the various modules of the computing devices described in FIG. 1. The object modeling machine-readable instructions 402 may be loaded for execution on a processor or processors 404. As used herein, a processor may include a microprocessor, microcontroller, processor module or subsystem, programmable integrated circuit, programmable gate array, or another control or computing device. The processor(s) 404 may be coupled to a network interface 406 (to allow the system 400 to perform communications over a data network) and/or to a storage medium (or storage media) 408.

The storage medium 408 may be implemented as one or multiple computer-readable or machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; optical media such as compact disks (CDs) or digital video disks (DVDs); or other appropriate types of storage devices.

Note that the instructions discussed above may be provided on one computer-readable or machine-readable storage medium, or alternatively, may be provided on multiple computer-readable or machine-readable storage media distributed in a system having plural nodes. Such computer-readable or machine-readable storage medium or media is (are) considered to be part of an article (or article of manufacture). An article or article of manufacture may refer to any appropriate manufactured component or multiple components. The storage medium or media may be located either in the machine running the machine-readable instructions, or located at a remote site, e.g., from which the machine-readable instructions may be downloaded over a network for execution.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A computer-implemented method of modeling a three-dimensional object, the method comprising:

receiving, at a computing device, a plurality of two-dimensional images depicting views of an object to be modeled in three dimensions;

processing the plurality of two-dimensional images, using the computing device, to generate a three-dimensional representation of the object;

analyzing the three-dimensional representation of the object, using the computing device, to determine whether sufficient visual information exists in the plurality of two-dimensional images to generate a three-dimensional model of the object; and in response to determining that sufficient visual information does not exist for a portion of the object, identifying the portion of the object in a user interface using the computing device, and providing, in the user interface, an indication to a user to capture an additional two-dimensional image of the identified portion of the object.

2. The computer-implemented method of claim 1, further comprising receiving the additional two-dimensional image depicting a view of the portion of the object, processing the additional two-dimensional image to generate an updated three-dimensional representation of the object, and analyzing the updated three-dimensional representation of the object to determine whether sufficient visual information exists in the plurality of two-dimensional images and the additional two-dimensional image to generate the three-dimensional model of the object.

3. The computer-implemented method of claim 2, further comprising, in response to determining that sufficient visual information exists to generate the three-dimensional model of the object, selecting a subset of images from among the plurality of two-dimensional images and the additional two-dimensional image, the subset of images being selected such that the subset includes sufficient visual information to generate the three-dimensional model of the object.

4. The computer-implemented method of claim 3, further comprising communicating the subset of images to a computing system, separate from the computing device, that processes the subset of images to generate the three-dimensional model that is compatible with a three-dimensional printer.

5. The computer-implemented method of claim 4, further comprising communicating camera pose information associated with each image of the subset of images to the computing system.

6. The computer-implemented method of claim 1, wherein processing the plurality of two-dimensional images to generate the three-dimensional representation of the object comprises generating a point cloud representation of the object, and wherein determining whether sufficient visual information exists in the plurality of two-dimensional images to generate the three-dimensional model of the object comprises identifying any regions of the point cloud representation that are under-represented by feature points.

7. The computer-implemented method of claim 6, wherein a region of the point cloud representation is under-represented by feature points when a number of feature points in the region is less than a threshold value that is based on a size of the region.

8. The computer-implemented method of claim 1, wherein processing the plurality of two-dimensional images to generate the three-dimensional representation of the object comprises generating a point cloud representation of the object and fitting a mesh to points of the point cloud representation, and wherein determining whether sufficient visual information exists in the plurality of two-dimensional images to generate the three-dimensional model of the object comprises identifying any regions of the point cloud representation as under-represented by feature points when the mesh cannot be fitted to the feature points.

9. The computer-implemented method of claim 1, wherein identifying the portion of the object in the user interface comprises highlighting the portion of the object in the user interface displayed by a display of the computing device.

10. The computer-implemented method of claim 1, wherein processing the plurality of two-dimensional images to generate the three-dimensional representation of the object comprises applying simultaneous localization and mapping (SLAM) processing to the plurality of two-dimensional images as the images are received to generate a sparse map of the object.

11. The computer-implemented method of claim 1, wherein the three-dimensional representation comprises feature points associated with respective features of the object, and wherein determining that sufficient visual information does not exist for the portion of the object comprises determining that a number of feature points for a respective feature in a region of the three-dimensional representation is less than a specified threshold.

12. A mobile computing system comprising:
an image capture device to capture two-dimensional images depicting views of an object to be modeled in three dimensions; and
one or more processors to:
process images captured by the image capture device to generate a three-dimensional map of an object depicted in the images;
analyze the three-dimensional map of the object to determine whether sufficient visual detail exists in the images to generate a three-dimensional model of the object; and
identify, in a user interface, a portion of the object that lacks sufficient visual detail in response to determining that sufficient visual detail does not exist in the images, and prompt, in the user interface, a user to capture an additional image of the portion of the object.

13. The mobile computing system of claim 12, wherein the three-dimensional map of the object comprises a point cloud representation of the object that is generated using simultaneous localization and mapping (SLAM) processing, and wherein determining that sufficient visual detail does not exist in the images comprises identifying any regions of the point cloud representation where a number of feature points is less than a threshold value.

14. The mobile computing system of claim 13, wherein the threshold value is based on a size of the region.

15. The mobile computing system of claim 12, wherein the three-dimensional map of the object comprises a point cloud representation of the object that is generated using simultaneous localization and mapping (SLAM) processing, and wherein determining that sufficient visual detail does not exist in the images comprises identifying any regions of the point cloud representation that cannot be fitted with a mesh.

16. The mobile computing system of claim 12, wherein the one or more processors are to add an indication in the user interface to indicate to the user to capture the additional image of the portion of the object.

17. A non-transitory computer-readable storage medium storing instructions that, when executed by one or more processors, cause the one or more processors to:
receive a plurality of images captured by an image capture device, the plurality of images depicting views of an object to be modeled in three dimensions;
process the plurality of images to generate visual information associated with the object;
determine whether the visual information is sufficient to reconstruct a well-defined three-dimensional model of the object; and
in response to determining that the visual information associated with a portion of the object is insufficient to reconstruct a well-defined three-dimensional model of the portion of the object, guide a user to capture additional views of the portion of the object.

18. The non-transitory computer-readable storage medium of claim 17, wherein the guiding of the user to capture the additional views of the portion of the object comprises adding an indication in a user interface to indicate to the user to capture the additional views of the portion of the object.

19. The non-transitory computer-readable storage medium of claim 17, wherein the visual information associated with the object comprises feature points associated with respective features of the object, and wherein determining that the visual information associated with the portion of the object is insufficient to reconstruct a well-defined three-dimensional model of the portion of the object comprises determining that a number of feature points for a respective feature in a region of the visual information is less than a specified threshold.

20. The non-transitory computer-readable storage medium of claim 17, wherein the visual information associated with the object comprises feature points associated with respective features of the object, and wherein determining that the visual information associated with the portion of the object is insufficient to reconstruct a well-defined three-dimensional model of the portion of the object comprises determining that a mesh cannot be fitted to feature points for a respective feature in a region of the visual information.

* * * * *